(12) United States Patent
MacDonald et al.

(10) Patent No.: US 6,410,672 B1
(45) Date of Patent: Jun. 25, 2002

(54) ION EXCHANGE AND ELECTROCHEMICAL METHODS AND DEVICES EMPLOYING ONE-STEP QUATERNIZED AND POLYMERIZED ANION SELECTIVE POLYMERS

(75) Inventors: Russell J. MacDonald, Wilmington; James A. Lech, Somerville, both of MA (US)

(73) Assignee: Ionics, Incorporated, Watertown, MA (US)

( * ) Notice: Subject to any disclaimer, the term of this patent is extended or adjusted under 35 U.S.C. 154(b) by 0 days.

(21) Appl. No.: 09/362,591

(22) Filed: Jul. 28, 1999

(51) Int. Cl.[7] ............................................. C08F 12/28
(52) U.S. Cl. .................... 526/310; 526/290; 526/293; 526/303.1; 526/307.2; 526/307.8; 526/310; 526/318.1; 526/326; 526/346; 521/25; 521/38
(58) Field of Search .................... 526/290, 293, 526/303.1, 307.2, 307.8, 310, 318.1, 326, 346; 521/38, 25

(56) References Cited

U.S. PATENT DOCUMENTS

| | | | |
|---|---|---|---|
| 3,152,061 A | 10/1964 | Nishihara | 204/296 |
| 3,258,435 A | 6/1966 | Imoto et al. | 260/2.1 |
| 3,563,921 A | 2/1971 | Bourat et al. | 260/2.1 |
| 3,644,225 A | 2/1972 | Quentin et al. | 260/2.1 E |
| 3,644,226 A | 2/1972 | Chabert | 260/2.1 E |
| 4,140,659 A | 2/1979 | Clemens et al. | 521/38 |
| 4,231,855 A | 11/1980 | Hodgdon et al. | 204/301 |
| 4,275,227 A | 6/1981 | MacDonald | 560/222 |
| 4,310,631 A * | 1/1982 | McDonald | 521/38 |
| 4,373,031 A | 2/1983 | Waite | 521/32 |
| 4,374,206 A | 2/1983 | MacDonald et al. | 521/38 |
| 4,374,720 A | 2/1983 | MacDonald | 204/252 |
| 5,037,858 A | 8/1991 | MacDonald | 521/38 |
| 5,118,717 A | 6/1992 | Hodgdon et al. | 521/38 |
| 5,137,925 A | 8/1992 | Hodgdon | 521/27 |
| 5,145,618 A | 9/1992 | MacDonald et al. | 264/46.3 |
| 5,202,009 A | 4/1993 | Andrieu et al. | 204/296 |
| 5,264,125 A | 11/1993 | MacDonald et al. | 210/500.35 |
| 5,284,879 A | 2/1994 | Hodgdon et al. | 521/27 |
| 5,300,288 A | 4/1994 | Albright | 424/78.08 |
| 5,321,110 A * | 6/1994 | Shih | 526/264 |
| 5,354,903 A | 10/1994 | MacDonald | 564/4 |
| 5,498,678 A | 3/1996 | Steffier | 526/200 |
| 5,510,394 A | 4/1996 | Hodgdon | 521/27 |
| 5,703,188 A * | 12/1997 | Mandeviolle, III et al. | 526/290 |
| 5,840,766 A * | 11/1998 | Mandeville, III et al. | 514/742 |

\* cited by examiner

*Primary Examiner*—David W. Wu
*Assistant Examiner*—Tanya Zalukaeva
(74) *Attorney, Agent, or Firm*—McDermott, Will & Emery

(57) ABSTRACT

The invention provides ion exchange and electrochemical methods and devices employing anion exchange polymers produced by substantially simultaneous quaternization and polymerization reactions. Anion selective polymers are produced in accordance with the invention by combining, an ethylenic tertiary amine monomer, an alkylating agent having a boiling point temperature of at least about 100° C., and a cross-linking agent in the presence of a polymerizing agent for a time and at a temperature sufficient to form the polymer. The alkylating agent and the cross-linking agent may be the same compound, a cross-linking alkylating agent. The polymers may be produced in the presence of solvents and/or in the presence of diluting monomers which are incorporated into the polymers.

8 Claims, 1 Drawing Sheet

ION EXCHANGE AND ELECTROCHEMICAL METHODS AND DEVICES EMPLOYING ONE-STEP QUATERNIZED AND POLYMERIZED ANION SELECTIVE POLYMERS

FIELD OF THE INVENTION

The present invention relates to the field of ion exchange and electrochemical methods and devices, and, in particular, to such methods and devices employing anion selective polymers produced by substantially simultaneous quaternization and polymerization reactions.

BACKGROUND OF THE INVENTION

Ion exchange ("IX") and electrochemical methods and devices using ion exchange structures were initially developed more than 50 years ago, and have since that time been improved to the point that such systems are commonly employed to purify fluids for a variety of applications. Typically, IX and electrochemical membrane methods and devices such as electrodialysis ("ED") and reversing type electrodialysis ("EDR") purify fluid through ion exchange or electric field-mediated transfer of ions through membranes from diluting or permeate streams passing through "less concentrated" compartments to concentrating or brine streams passing through "more concentrated" compartments. Generally, anion transfer and cation transfer membranes are alternated in ED methods and devices, the membranes being placed between an anode (positive electrode) and a cathode (negative electrode) across which a DC electric field is applied transverse to the fluid flow directions. Anion transfer membranes allow passage only of low molecular weight negatively charged species (anions), and cation transfer membranes allow passage only of low molecular weight positively charged species (cations). Transfer of ions across membranes is mediated by the attraction of anions to the anode and cations to the cathode. The combination of an anode, a cathode, and alternating anion and cation transfer membranes therebetween is commonly referred to as an ED "stack" or pack.

FIG. 1 depicts a schematic view of an exemplary ED unit 10 having a cathode 12 and an anode 14 and cation transfer membranes 20 alternating with anion transfer membranes 22. Cation transfer membranes 20 and anion transfer membranes 22 form a plurality of alternating ED diluting compartments 24 and ED concentrating or brine compartments 26. A fluid, for example water, enters the ED unit 10 at electrode stream inlets 52 and exits ED unit 10 at electrode stream outlets 54 to form electrode streams 50. The electrode streams 50 that comes into contact with cathode 12 or with anode 14 do not mix with, and are not in fluid communication with, fluid in ED feed stream 30 or with fluid in ED brine stream 40 (see below).

Fluid to be purified flows into ED unit 10 in the form of ED feed stream 30 which enters the unit at ED feed stream inlet 32. ED feed stream inlet 32 is in fluid communication with ED feed stream inlet manifold 34, through which fluid to be purified is delivered to one or more ED diluting (less concentrated) compartments 24. The number of diluting compartments 24 in an ED unit can vary according to the application in which the ED unit is used. Determinations of the appropriate number of diluting compartments for a particular application can be accomplished empirically, on the basis of the desired capacity of the fluid purification system and the amount and identity of contaminants in the feed stream. As defined herein, diluting compartment 24 of ED unit 10 involves the sum of all diluting compartments contained within the unit. After traversing the diluting compartment 24, fluid from ED feed stream 30 enters ED product stream outlet manifold 36, exiting the ED unit as less concentrated product stream 30a at ED product stream outlet 38. Fluid is purified in the ED diluting compartments 24 by virtue of passage of ions out of the ED diluting compartments 24 into the more concentrated ED concentrating or brine compartments 26.

In parallel to the flow of ED feed stream 30, an ED concentrate or brine influent 40 flows into unit 10 at ED concentrate or brine stream inlet 42. ED concentrate or brine stream inlet 42 is in fluid communication with ED concentrate or brine stream inlet manifold 44, through which fluid that receives ions from the ED diluting compartments 24 is delivered to one or more ED concentrating or brine compartments 26. The number of concentrating or brine compartments in an ED unit may vary according to the application in which the ED unit is used, but will be equal to (or±1) the number of diluting compartments in the unit. In accordance with the invention, concentrating or brine compartment 26 of ED unit 10 comprises the sum of all concentrating or brine compartments contained within the unit. After traversing the ED concentrating compartment 26, fluid from ED concentrate or brine influent 40 enters ED concentrate or brine stream outlet manifold 46, exiting the ED unit at ED concentrate or brine stream outlet 48. After exiting from ED concentrate or brine stream outlet 48, all or at least a portion of the brine stream is discarded as "blowdown", and the remainder, if any, of the effluent brine stream is recycled into concentrate or brine influent 40, upstream of brine stream inlet 42.

Anion selective polymers for use in anion exchange resins or transfer membranes involved in the electrochemical devices and processes described above may be manufactured via a variety of techniques. For example, anion selective polymers may be prepared by co-polymerizing methacrylate esters containing amine groups of the tertiary type, with cross-linking methacrylate esters (see for example U.S. Pat. No. 4,231,855 by Hodgdon et al.). The resulting polymer with pendant tertiary amine groups may be quaternized with an alkyl halide, such as methyl chloride, so that the tertiary amine groups are converted to quaternary ammonium salts.

The above-described technique may require washing steps between process steps and requires chemical reactions on polymerized sheets. Further, exchange resins and transfer membranes formed of methacrylate esters may degrade rapidly in the presence of caustic solutions. In addition, exchange resins and transfer membranes formed by the above-identified technique may lack resiliency and further, the membranes may leak, because the post-polymerization quaternization reactions may weaken the resin.

Anion selective polymers for use in anion exchange resin particulates or transfer membranes employed in electrochemical devices and methods may also be prepared by solubilizing a cross-linking monomer such as methylene bisacrylamide (MBA), by pre-treatment with a caustic solution. The solubilized MBA may then be combined with an acrylic monomer, such as dimethylaminopropylmethacrylamide, in a water soluble solvent and polymerized. See U.S. Pat. Nos. 5,037,858 and 5,354,903 to MacDonald. As in the previously identified technique, the resulting polymer may have to be further reacted so that its pendant tertiary amine group is converted to a quaternary ammonium salt to form the anion selective polymer. Alternatively, these patents teach combining the solubilized MBA with an ionogenous acrylic monomer which has already undergone quaternization, such as methacrylamido-propyltrimethylammonium chloride, in a water soluble solvent and polymerizing the liquid mixture.

Accordingly, the above-identified technique requires a caustic solution pretreatment step for solubilizing the cross-linking monomer. Further, as in the previously described technique, post-polymerization quaternization may weaken the exchange resins and transfer membranes made from such polymers. The alternative process involving use of an ionogenous acrylic monomer requires a special solvent to prevent the quaternary ammonium salt from precipitating out of the liquid solution before the polymerization occurs.

Thus, there is a need to develop caustic stable anion exchange resins and transfer membranes with resilient surfaces and substantially leak-free transfer membranes for use in ion exchange and electrochemical methods and devices. Further, there is a need to develop simplified methods of forming such exchange resins and transfer membranes which avoid precipitation resulting from quaternization prior to polymerization. In addition, there is a need to develop simplified methods of forming such exchange resins and transfer membranes which avoid the necessity of washing steps associated with polymer formation prior to quaternization.

SUMMARY OF THE INVENTION

The present invention provides caustic-stable anion selective polymers for forming exchange resins and transfer membranes as well as methods of making the same. The present invention also provides devices and methods employing exchange resins and transfer membranes incorporating these polymers. The process of making the anion selective polymers of the invention involves substantially simultaneous quaternization and polymerization reactions. An ethylenic tertiary amine monomer is reacted with an alkylating agent having a boiling temperature of at least about 100° C., and a cross-linking agent in the presence of a polymerization agent. Alternatively, an ethylenic tertiary amine monomer is reacted with an alkylating agent having cross-linking capabilities and having a boiling temperature of at least about 100° C. in the presence of a polymerization agent.

In an aspect, the invention provides a polymer preparation process including combining an ethylenic tertiary amine monomer, an alkylating agent having a boiling point of at least about 100° C. and a cross-linking agent in the presence of a polymerization agent at a temperature and for a time sufficient to form the polymer.

In an embodiment of this aspect of the invention, the monomers and the agent are combined in the presence of a solvent. In another embodiment of this aspect of the invention, the ethylenic tertiary amine is dimethylaminopropylmethacrylamide (DMAPMA), the alkylating agent is butyl bromide, the cross-linking agent is divinylbenzene, and the solvent is 2-pyrrolidone.

In another aspect, the invention provides a polymer preparation process including combining an ethylenic tertiary amine monomer and a cross-linking alkylating agent having a boiling temperature of at least about 100° C. in the presence of a polymerization agent at a temperature and for a time sufficient to form the polymer. In an embodiment of this aspect of the invention, the combining step is carried out in the presence of a solvent. In another embodiment of this aspect of the invention, the combining step is carried out in the presence of a diluent ethylenic monomer. If a solvent is present, then a diluent ethylenic monomer soluble in the solvent is selected. Preferably, the ethylenic tertiary amine monomer is DMAPMA, the cross-linking alkylating agent is 1,6-dibromohexane, the diluent ethylenic monomer is N-vinylpyrrolidone, and the solvent is water.

In still another aspect of the invention, a compound having the following formula is prepared.

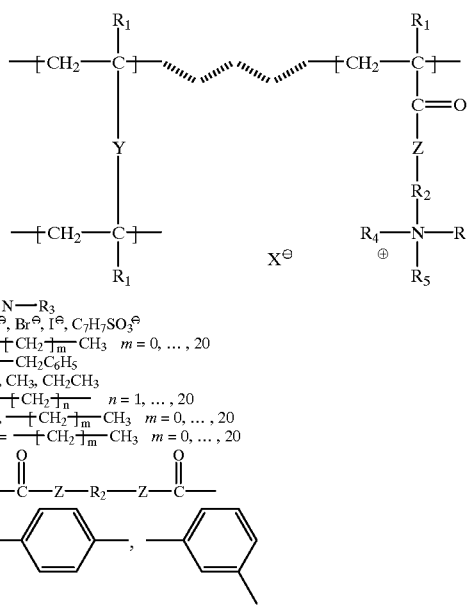

In yet another aspect of the invention, a compound having the following formula is prepared.

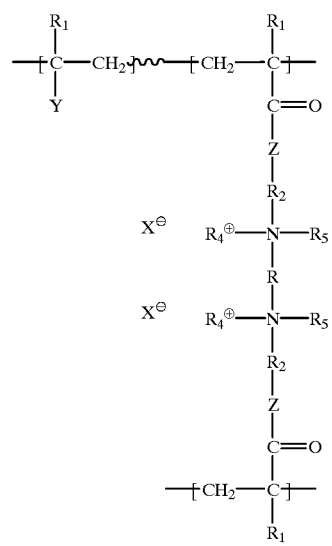

-continued

Z = O, N—R$_3$
X = Cl$^\ominus$, Br$^\ominus$, I$^\ominus$, C$_7$H$_7$SO$_3^\ominus$
R = —(CH$_2$)$_m$—   m = 3, ... , 20
R$_1$ = H, CH$_3$, CH$_2$CH$_3$
R$_2$ = —(CH$_2$)$_n$—   n = 1, ... , 20
R$_3$ = H, —(CH$_2$)$_m$—CH$_3$   m = 0, ... , 20
R$_4$, R$_5$ = —(CH$_2$)$_m$—CH$_3$   m = 0, ... , 20

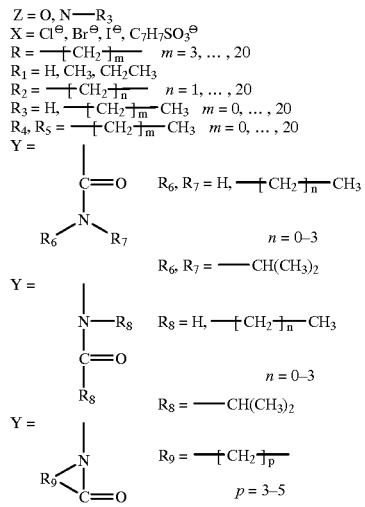

R$_6$, R$_7$ = H, —(CH$_2$)$_n$—CH$_3$
n = 0–3
R$_6$, R$_7$ = —CH(CH$_3$)$_2$

R$_8$ = H, —(CH$_2$)$_n$—CH$_3$
n = 0–3
R$_8$ = —CH(CH$_3$)$_2$

R$_9$ = —(CH$_2$)$_p$—
p = 3–5

BRIEF DESCRIPTION OF THE DRAWING

The foregoing and other objects of the invention, the various features thereof, as well as the invention itself, may be more fully understood from the following description, when read together with the accompanying drawing.

DETAILED DESCRIPTION OF THE PREFERRED EMBODIMENT

Figure 1:
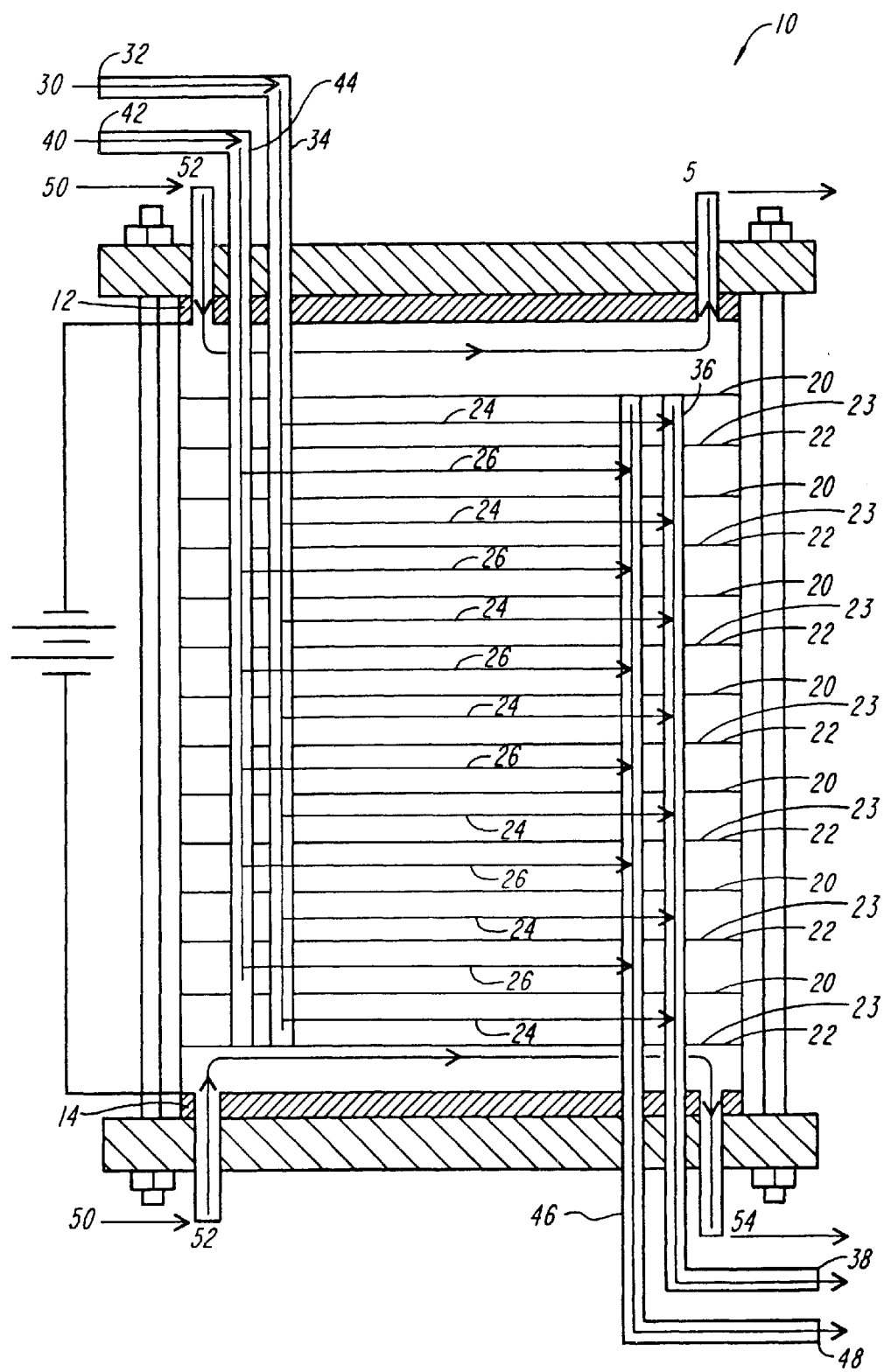
FIG. 1 is a schematic diagram of an electrodialysis device, which includes anion exchange transfer membranes prepared according to an aspect of the invention.

One-step anion selective polymers are produced in accordance with processes of the present invention through substantially simultaneous quaternization/polymerization reactions. An ethylenic tertiary amine monomer is reacted with an alkylating agent and a cross-linking agent in the presence of a polymerization agent. Alternatively, an ethylenic tertiary amine monomer is reacted with an alkylating agent having cross-linking capabilities in the presence of a polymerization agent. The polymers of the present invention are substantially insoluble in aqueous solutions due to their cross-linkages.

The term "one-step" as used herein, as in for example, "one-step" anion selective polymers, refers to anion selective polymers produced by substantially simultaneous quaternization and polymerization reactions.

The term "quaternization/polymerization reaction", as used herein, refers to substantially simultaneous quaternization and polymerization reactions.

In one aspect of the present invention, one-step anion selective polymers are produced by reacting an ethylenic tertiary amine monomer, an alkylating agent having a boiling point of at least about 100° C. and a cross-linking agent. The reaction occurs in the presence of a polymerizing agent at a temperature and for a time sufficient to permit substantially simultaneous quaternization and polymerization of the monomers to form the polymer.

A typical structure of an ethylenic tertiary amine monomer useful in this aspect of the invention is set forth below.

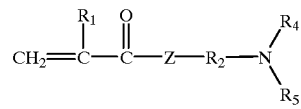

Z=O, N—R$_3$

R$_1$=H, CH$_3$

R$_2$=—(CH$_2$)$_n$— n=0, ... 20

R$_3$=H, —(CH$_2$)$_m$CH$_3$ m=0, ... 20

R$_4$, R$_5$=—(CH$_2$)$_m$CH$_3$ m=0, ... 20

Preferably, the ethylenic tertiary amine monomers used in this aspect of the invention are non-aromatic. More preferably, the ethylenic tertiary amine monomer used in this aspect of the present invention is selected from the group consisting of dimethylaminopropylmethacrylamide (DMAPMA), dimethylaminopropylacrylamide (DMAPAA), diethylaminopropylmethacrylamide (DEAPMA), dimethylaminoethylmethacrylate (DMAEMA) and mixtures thereof. Even more preferably, the ethylenic tertiary amine monomer is DMAPMA. Ethylenic tertiary amine monomers useful in this aspect of the present invention are commnercially available from, for example, Creanova, Somerset, N.J.

Alkylating agents suitable for use in this aspect of the present invention include alkyl halides having a boiling temperature of at least about 100° C. A typical structure of such an alkylating agent is set forth below.

R—X

X=Cl, Br, I, C$_7$H$_7$SO$_3$—

R = —(CH$_2$)$_m$—CH$_3$   m = 0, ... , 20
 = —CH$_2$Ph

OR

X—R—X

X=Cl, Br, I, C$_7$H$_7$SO$_3$

R=—(CH$_2$)$_m$— m=1 ... 20

Preferably, the alkylating agent used in this aspect of the present invention is selected from the group consisting of butyl bromide (BuBr), hexyl chloride, benzyl chloride, butyl iodide, 1,6-dibromohexane, 1,4-dibromobutane, 1,6-dichiorohexane, 1,4-dichlorobutane, 1,10-diiododecane and mixtures thereof. More preferably, the alkylating agent is BuBr and/or 1,6-dibromohexane. Alkylating agents useful in this aspect of the present invention are commercially available from, for example, Great Lakes Chemical Corp., West Lafayette, Ind.

Cross-linking agents suitable for use in this aspect of the invention are capable of polymerizing with the ethylenic tertiary amine monomer of the reaction. Preferably, these cross-linking agents are substantially stable to hydrolysis and caustic solutions. A typical structure of such a cross-linking agent is set forth below.

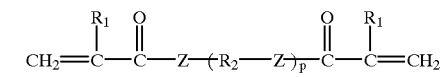

p=0, ... 20

Z=O, N—R$_3$

R$_1$=H, CH$_3$, CH$_2$CH$_3$

R$_2$=$\pm$CH$_2\pm_n$ n=1, ... 20

R$_3$=H, $\pm$CH$_2\pm_m$CH$_3$ m=0, ... 20

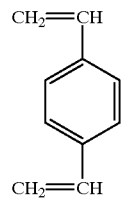
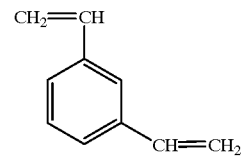

Preferably, the cross-linking agents used in this aspect of the present invention include divinyl benzene (DVB), ethylene glycol dimethacrylate (EGDM), ethylene glycol diethacrylate, trimethylol propane trimethacrylate (TMPTMA), trimethylol propane triethacrylate, methylene bisacrylamide, polyethylene glycol dimethacrylate, polyethylene glycol dimethacrylate, 1,6-dibromohexane, 1,4-dibromobutane, 1,6-dichlorohexane, 1,4-dichlorobutane, 1,10-diiododecane and mixtures thereof. More preferably, the cross-linking agent is divinylbenzene. Cross-linking agents useful in this aspect of the present invention are commercially available from, for example, Dow Chemical Co., Midland, Mich.; Riedel-DeHaen AG, Seelze, Germany, and Great Lakes Chemical Corp., West Lafayette, Ind.

The cross-linking agent substantially ties or links together polymeric chains into a network of polymers. The resulting polymeric network is substantially insoluble and precipitates out from solvents in substantially solid form. Without such cross-linking, the polymers of the invention would dissolve in water and thus, would be ineffective for use as, for example, ion exchange membranes.

In an embodiment of this aspect of the invention, the monomer and the agents are combined in the presence of a solvent. Any solvent, or mixture thereof, is suitable for use in this embodiment of this aspect of the invention, so long as the solvent is not itself polymerizable. Solvents suitable in this embodiment of the invention include water, polyethylene glycols, dimethylsulfoxide, 2-pyrrolidone, N-methyl pyrrolidone and mixtures thereof. More preferably, 2-pyrrolidone is the solvent used in this embodiment of the invention. The non-aqueous solvents useful in this aspect of the invention are commercially available from, for example, BASF, Parsippany, N.J.; Dow Chemical Co., Midland, Mich.; and Gaylord Chemicals, Gainesville, Fla.

The quaternization/polymerization reaction of this aspect of the present invention is represented by the following non-limiting exemplary reaction involving DMAPMA, BuBr and DVB as follows.

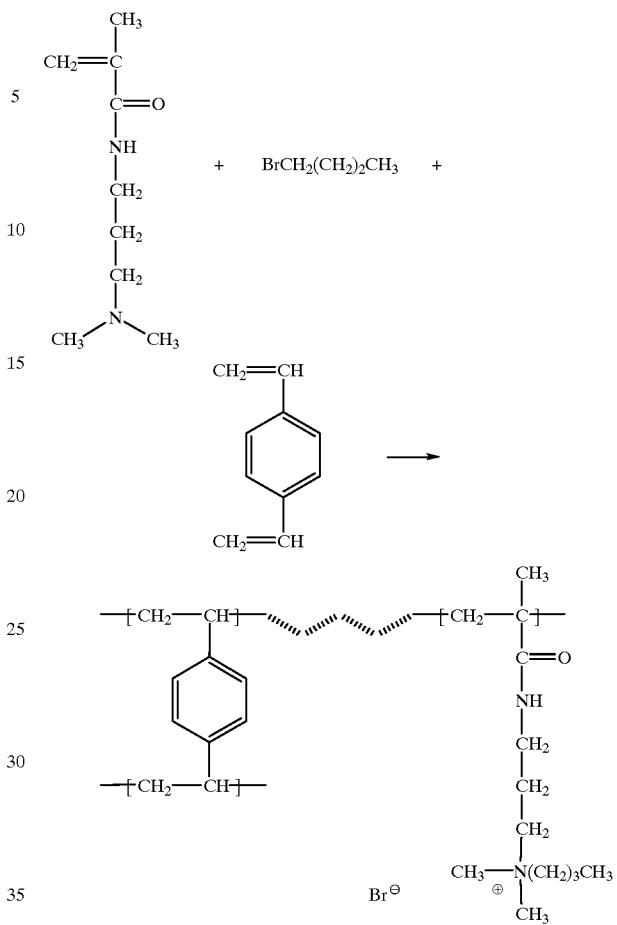

The quaternization/polymerization reaction of the present invention occurs in the presence of a polymerization agent. The polymerization agent can include heat. The polymerization agent can also include visible and ultraviolet radiation having a wavelength range of about 600 nm to about 190 nm, electromagnetic radiation, electron beam radiation, polymerization initiating catalysts, chemical promoters and mixtures thereof.

The polymerization initiating catalysts include catalysts which are spontaneously active and catalysts which are activated by heat; by visible, ultraviolet, electromagnetic or electron beam radiation as identified above; or by chemical promoters. In general, the amount of polymerization initiating catalyst is about 0.1% to about 5.0% of the weight of the monomers employed in the polymerization reaction.

The term "chemical promoters", as used herein, refers to a substance which increases the rate of polymerization either by itself or in combination with another polymerization agent. For example, methyl ethyl ketone peroxide can function as a polymerization agent by itself, but its rate of initiation can be greatly increased by small amounts of transition metal salt chemical promoters such as, for example, cobalt naphthenate. Similarly, dibenzoyl peroxide can function as a polymerization agent by itself, but its action can be accelerated by a dimethyl aniline chemical promoter. The UV radiation polymerization agents can become more efficient in the presence of chemical promoters which are photoinitiators, that is, chemical compounds which generate free radicals. Non-limiting examples of such photoinitiating chemical promoters include benzophenone, benzil, anthraquinone, eosin and methylene blue.

The quaternization/polymerization reaction can be performed at a temperature within the range of about 40° C. to about 150° C. Preferably, the reaction is performed at a temperature within the range of about 90° C. to about 100° C.

The anion selective polymers of this aspect of the present invention can be synthesized using a wide range of relative proportions of ethylenic tertiary amine monomers to alkylating agents to cross-linking agents. Preferably, the mixture contains about 10 mole % to about 70 mole % of ethylenic tertiary amine monomer to about 10 mole % to about 70 mole % of alkylating agent to about 90 mole % to about 30 mole % of cross-linking agent.

In one aspect of the present invention, one-step anion selective polymers are produced by reacting an ethylenic tertiary amine monomer, an alkylating agent having a boiling point of at least about 100° C. and a cross-linking agent. The reaction occurs in the presence of a polymerizing agent at a temperature and for a time sufficient to permit substantially simultaneous quatemization and polymerization of the monomers to form the polymer.

The ethylenic tertiary amine monomers suitable for use in this aspect of the present invention include the ethylenic tertiary amine monomers identified above. Preferably, the ethylenic tertiary amine monomers used in this aspect of the invention are non-aromatic. More preferably, the ethylenic tertiary amine monomers are dimethylaminopropyl-methacrylamide (DMAPMA) and dimethylaminopropylacrylamide (DMAPAA). The ethylenic tertiary amine monomers useful in this aspect of the invention are available from, for example, Creanova, Somerset, N.J.

The cross-linking alkylating agents suitable for use in this aspect of the present invention include alkyl multi-halides having a boiling point temperature of at least about 100° C. The general structure of such a cross-linking alkylating agent is set forth below.

X—R—X

X=Cl, Br, I, C$_7$H$_7$SO$_3$

R=—[—CH$_2$]$_m$— m=2, . . . 20

=—CH$_2$C$_6$H$_5$—

Preferably, cross-linking alkylating agents suitable in this aspect of the present invention include alkyl dihalides, such as 1,6-dibromohexane (DBH), 1,4-dibromobutane, 1,6-dichlorohexane, 1,4-dichlorobutane, and 1,10-diiododecane. More preferably, the alkyl dihalide is DBH. The cross-linking alkylating agents useful in this aspect of the invention are commercially available from, for example, Riedel-DeHaen AG, Seelze, Germany, and Great Lakes Chemical Corp., West Lafayette, Ind.

In embodiments of the invention, the ethylenic tertiary amine and the cross-linking alkylating agent are combined in the presence of a solvent. The solvents suitable for this aspect of the invention include water, polyethylene glycols, dimethylsulfoxide, 2-pyrrolidone, N-methyl pyrrolidone and mixtures thereof. Preferably, the solvent is water. Some non-aqueous solvents useful in this aspect of the invention are commercially available from, for example, BASF, Parsippany, N.J.; Dow Chemical Co., Midland, Mich.; and Gaylord Chemicals, Gainesville, Fla.

In some embodiments of the invention, the ethylenic tertiary amines and cross-linking agents and the alkylating agents, or the ethylenic tertiary amine monomers and the cross-linking alkylating agents are combined with diluent ethylenic monomers. Any diluent ethylenic monomer may be employed so long as the diluent ethylenic monomer is capable of polymerizing with the ethylenic tertiary amine monomer of the one-step quaternization/polymerization reaction and where a solvent is used, the diluent ethylenic monomer is soluble in the solvent employed. Preferably, the diluent ethylenic monomers are substantially stable to hydrolysis and caustic solutions. Further, non-aromatic diluent ethylenic monomers are preferred since the resulting anion exchange structures tend to be fouling resistant. The volume of the diluent ethylennic monomer present during the reaction determines the percent porosity and substantially fixes the water holding capacity or content of the resulting polymer. The diluent ethylenic monomer employed is typically about 10% to about 50% by volume of the final monomer formulation but can be more or less if so desired.

Where water is the selected solvent, the suitable diluent ethylenic monomers include N-vinylpyrrolidinone (NVP), N-methylmethacrylamide, N,N-dimethylmethacrylamide, N-isopropylacrylamide, N-vinylformamide, N-methyl-N-vinylformamide and mixtures thereof. Preferably, the diluent ethylenic monomer is NVP where water is the solvent.

The quaternization/polymerization reaction of the process involving the combination of the ethylenic tertiary amine monomers and the cross-linking alkylating agents is represented by the following non-limiting exemplary reaction involving DMAPMA, DBH and NVP as follows.

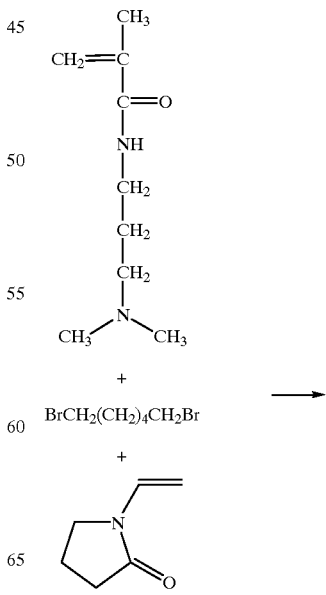

-continued

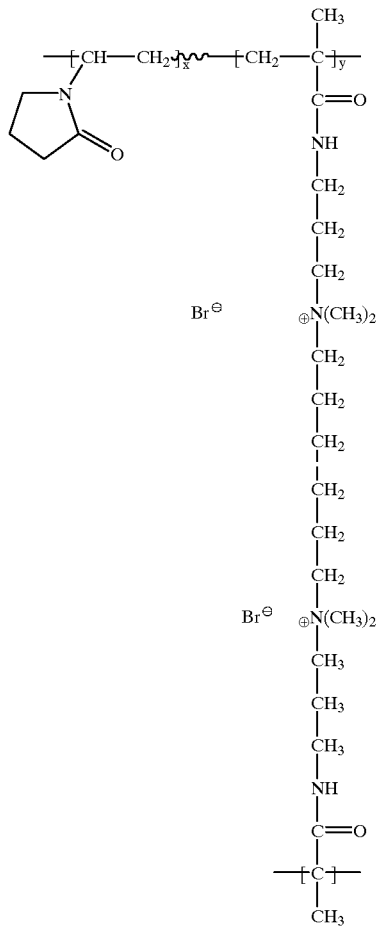

The reaction occurs in the presence of a polymerization agent, as described above in the first aspect of the invention. The reaction can be performed at a temperature within the range of about 40° C. to about 150° C. Preferably, the reaction is performed at a temperature within the range of about 85° C. to about 110° C.

The anion selective polymers of this aspect of the present invention can be synthesized using a wide range of ethylenic tertiary amine monomers to cross-linking alkylating agents to diluent ethylenic monomers. Preferably, the mixture contains about 50 mole % to about 100 mole % of ethylenic tertiary amine monomer to about 25 mole % to about 50 mole % of cross-linking alkylating agent to about 0 mole % to about 50 mole % of diluent ethylenic monomer.

The polymers formed using the processes set forth above can be used to form anion selective exchange resins and/or transfer membranes. When polymers manufactured by the processes of the invention are used as transfer membranes, the transfer membrane can be formed by casting the liquid monomer mixture on a reinforcing Anion selective exchange resins and transfer membranes formed from polymers produced according to the processes of the present invention can be used in well-known ion exchange and electrochemical devices and methods. FIG. 1 illustrates anion transfer membranes 22 formed with anion selective polymers 23 formed according to the processes of the invention.

The following examples illustrate the preferred modes of making and practicing the present invention, but are not meant to limit the scope of the invention since alternative methods can be used to obtain similar results.

EXAMPLE ONE

Thirty-one (31) volume % dimethylaminopropyl-methacrylamide (DMAPMA) ethylenic tertiary amine was mixed with 19 volume % of butyl bromide (BuBr) alkylating agent and 18 volume % of divinylbenzene (DVB) cross-linking agent in 32 volume % of 2-pyrrolidone solvent at room temperature of approximately 70° F. in the presence of 0.1 volume % of tertiary butyl peroctanoate (TPO) catalyst.

After complete dissolution of the mixture, the liquid mixture was added to a acrylic cloth reinforcing substrate to form sample membrane. The cast membrane was cured between glass plates at 100° C. temperature for approximately thirty (30) minutes.

The sample membrane was characterized following standard ion exchange membrane characterization procedures, as shown in Table I below.

TABLE I

Membrane A Characteristics

| Capacity (meq/g) | Water content (%) | Resistivity (ohm-cm$^2$) | Thickness (cm) | Transport No. | Water Transport No. (mL/F) |
|---|---|---|---|---|---|
| 2.72 | 41.1 | 9.8 | .056 | .971 | 92 |

The anion exchange capacity was expressed as milligram-equivalents per gram of dry anion exchange resin in the nitrate form (i.e., not including fabric). The water content was expressed as percent by weight of the wet anion exchange resin in the nitrate form (i.e., not including fabric). The areal resistance of a square centimeter of membrane in the chloride form was measured in 0.01N NaCl at 1000 Hz. The transport no. indicated the efficiency of the membrane in transporting anions as determined potentiometrically between solutions of 1.0N NaCl and 0.5N NaCl. The water transport no., which indicated the volume of water flowing, upon passage of an electric current between solutions of 0.6N NaCl was expressed in milliliter/Faraday.

Caustic stability of the membranes made using the process above was also tested by soaking the membranes in 1N NaOH at room temperature of about 70° F. Performance of the membrane over time is summarized in Table II below.

TABLE II

Performance Of Membrane A Over Time

| Caustic Solution Soak Time (days) | Capacity (meq/g) | Water content (%) |
|---|---|---|
| 0 | 2.72 | 41.1 |
| 1 | 2.78 | 40.4 |
| 6 | 2.66 | 41.6 |
| 13 | 2.63 | 42.8 |
| 15 | 2.69 | 44.1 |
| 20 | 2.6 | 44.5 |
| 27 | 2.49 | 44.3 |
| 37 | 2.49 | 46 |

EXAMPLE TWO

In this example, 27 weight % of the ethylenic tertiary amine monomer dimethylaminopropyl methacrylamide (DMAPMA) was mixed with 13 weight % of the diluent ethylenic monomer N-vinylpyrrolidone (NVP) in 40 weight % of water as a solvent. Approximately 19 weight % of 1,6-dibromohexane (DBH) was added as a cross-linking alkylating agent. The mixture was initially heated to 70° C. and then cooled to about 25° C. The water soluble catalyst VA04™ (produced by Wako Chemicals USA, Inc., Richmond, Va.) in the amount of 1 weight percent was added to the mixture. After complete dissolution of the mixture, the mixture was cast onto acrylic cloth reinforcing substrate to form sample membrane B. The cast membrane was cured between glass plates at approximately 85° C. for approximately thirty (30) minutes.

The sample membrane B was characterized following standard ion exchange characterization procedures, as described above in Example One. The properties of the membrane are set forth below in Table III.

TABLE III

Membrane B Characteristics

| Capacity (meq/g) | Water content (%) | Resistivity (ohm-cm$^2$) | Thickness (cm) | Transport No. | Water Transport No. (mL/F) |
|---|---|---|---|---|---|
| 2.80 | 42.6 | 9.3 | .051 | .968 | 90 |

Although a few exemplary embodiments of this invention have been described in detail above, those skilled in the art will readily appreciate that many modifications are possible in the exemplary embodiments without materially departing from the novel teachings and advantages of this invention. For example, a variety of solvents may be used. Accordingly, all such modifications are intended to be included within the scope of this invention as defined in the following claims.

We claim:

1. A compound having the formula

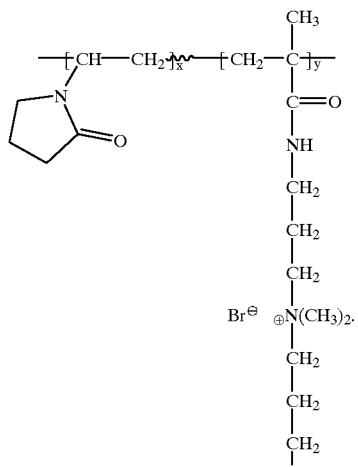

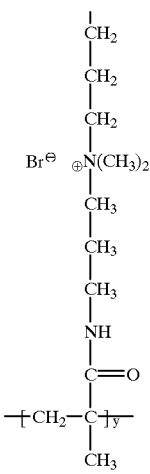

2. The polymer of claim 1 produced by the process comprising the step of combining into a mixture at least one ethylenic tertiary amine monomer with at least one crosslinking alkylating agent having a boiling temperature of at least 100° C. in the presence of a diluent ethylenic monomer and a polymerization agent for a time and at a temperature sufficient to form the polymiier, where in the ethylenic tertiary amine monomer is dimethylaminopropylmethacrylamide, the crosslinking alkylating agent is 1,6-dibomohexane, and the diluent ethylenic monomer is N-vinyl pyrrolidinone.

3. The polymer produced by the process of claim 2, wherein the combining step is carried out in the presence of a solvent.

4. The polymer produced by the process of claim 2, wherein the solvent is water.

5. The polymer produced by the process of claim 4, wherein the ethylenic tertiary amine, the cross-linking alkylating agent, the diluent monomer, and the solvent are combined in the presence of a reinforcing substrate.

6. The polymer produced by the process of claim 5, wherein the reinforcing substrate is selected from the group consisting of synthetic fabric, glass fiber cloth, polyvinylidene chloride screen, glass paper, treated cellulose battery paper, polystyrene-coated glass fiber mat, and polyvinyl chloride battery paper.

7. The polymer produced by the process of claim 5 wherein the reinforcing substrate is polypropylene cloth.

8. The polymer produced by the process of claim 2 wherein the mixture contains about 50 mole percent to about 100 mole percent of ethylenic tertiary amine monomer to about 25 mole percent to about 50 mole percent of crosslinking alkylating agent to about 50 mole percent to greater that 0 mole percent of diluent ethylenic monomer.

* * * * *